(No Model.)
2 Sheets—Sheet 1.
L. H. COLEMAN.
OIL FILTER.
No. 511,932.
Patented Jan. 2, 1894.
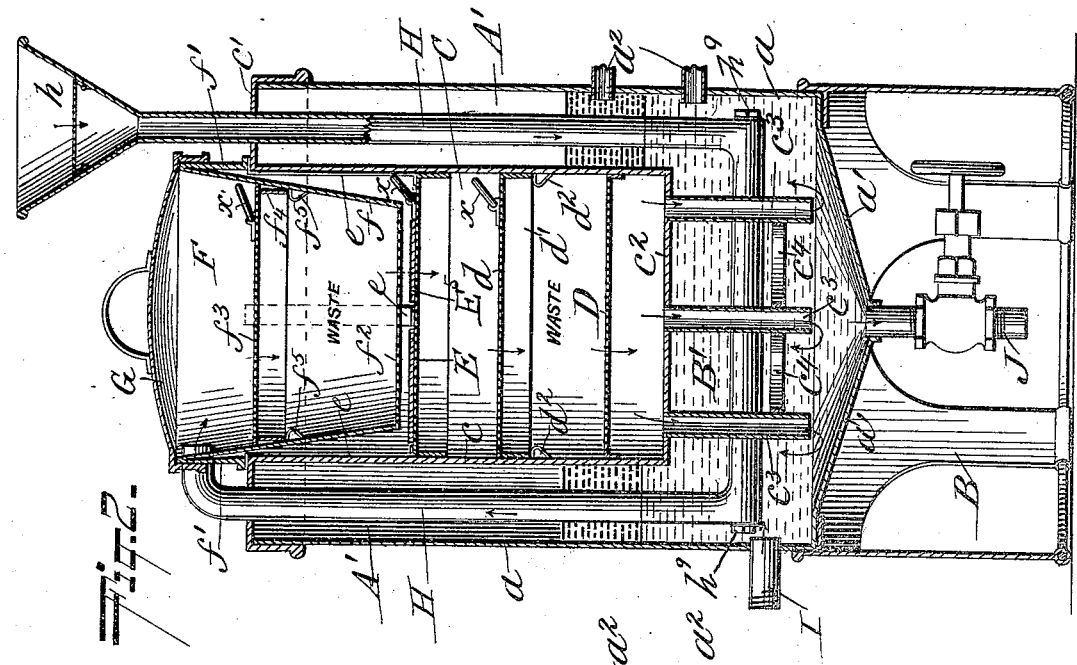
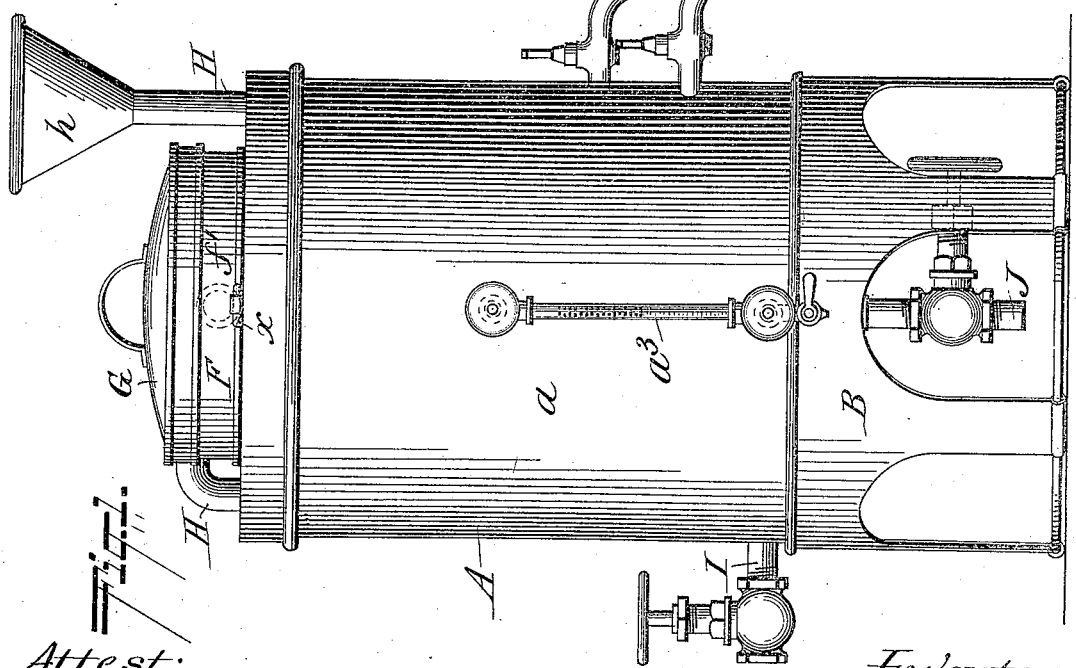
Attest:
F. H. Schott
M. L. Chandler
Inventor
Lewis H. Coleman,
by M. T. E. Chandler & Co
Attys (No Model.) 2 Sheets—Sheet 2.
L. H. COLEMAN.
OIL FILTER.
No. 511,932. Patented Jan. 2, 1894.
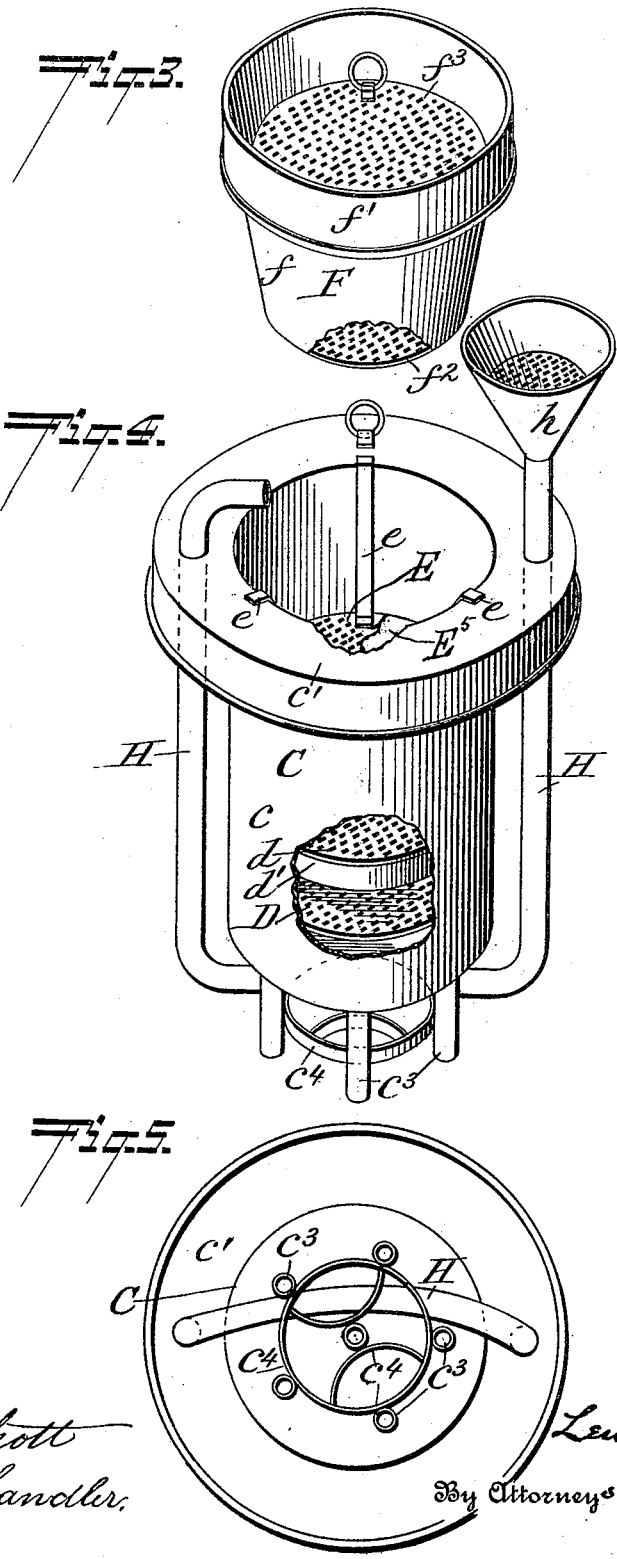

UNITED STATES PATENT OFFICE.

LEWIS H. COLEMAN, OF WASHINGTON, DISTRICT OF COLUMBIA.

OIL-FILTER.

SPECIFICATION forming part of Letters Patent No. 511,932, dated January 2, 1894.

Application filed May 20, 1893. Serial No. 474,868. (No model.)

*To all whom it may concern:*

Be it known that I, LEWIS HENRY COLEMAN, a citizen of the United States, residing at Washington, in the District of Columbia, have invented certain new and useful Improvements in Oil-Filters, of which the following is a full, clear, and exact description, such as will enable those skilled in the art to which it appertains to make and use the same, reference being had to the accompanying drawings, which form a part of this specification.

The invention relates to improvements in that class of oil filters which are particularly adapted to purify and to cleanse the waste oil which has been used for lubricating purposes and which has been caught in vessels suitably placed beneath the journals and other wearing portions of machinery.

It has for its object the construction of such a device in which the oil can be heated before it is turned into the filter proper and which can be subjected to heat during its entire passage through the machine, in which the oil can in no way reach the tank for collecting the cleansed oil without passing directly through the several filtering mediums, in which the filtering medium is supported in two separate bodies and has a fabric interposed between the two bodies so that a more thorough distribution of the oil through the several mediums can be secured, in which the oil is finally cleansed by being passed through a body of water.

It has also for its object a construction that is simple, compact and cheap, and which can be easily cleaned.

The invention consists primarily of a filter, proper, supported in a casing, the shells of the filter and casing forming an annular chamber between them and the bottoms a water reservoir, the reservoir and annular chamber being connected with a steam generator so that the filter proper can be heated during the entire passage of the oil, of a feed pipe leading from the exterior of the casing through the annular chamber and reservoir to the upper part of the filtering receptacle, of the filter proper formed of a cylindrical shell having a multiplicity of pipes leading from its bottom to the lower part of the water reservoir and a series of reticulated plates placed within the shell to support the filtering medium in two separate bodies and a fabric between the said bodies.

The invention also consists in the novel construction, combination and arrangement of parts such as will be hereinafter more fully described, pointed out in the appended claims and illustrated in the accompanying drawings.

In the accompanying drawings, in which similar letters of reference designate corresponding parts, Figure 1 is an elevation of a filter embodying the invention. Fig. 2 is a transverse vertical section of the same. Fig. 3 is a detail perspective view showing the pan which supports a portion of the filtering medium in the upper part of the filter, proper, and into which the oil is first introduced. Fig. 4 is a detail perspective view showing the filtering receptacle, partly in section, and the pan being removed; and Fig. 5 is a plan view of the bottom of the device.

Referring to the drawings by letter, A designates the main casing which incloses the filter proper, the water and oil reservoirs, the feed pipe, and their adjuncts. It is formed of a cylindrical shell $a$ of sheet metal and a conical shaped bottom $a'$. It is provided with the faucets $a^2$, $a^2$, placed at different heights and the gage $a^3$ situated with relation to the faucets. By means of the faucets and gage an inspection of the water and oil in the reservoirs can be obtained. Also by means of the faucets the water can be kept at the proper height and the oil withdrawn when it is desired to use the same. The casing is removably supported upon the base B.

C designates the filtering receptacle proper. It consists of the cylindrical shell $c$ having the horizontal annular flange $c'$ projecting from its upper edge. This flange, in part, forms a covering for the main casing and also serves to support the filtering receptacle within the said casing. From the bottom $c^2$ of the filtering receptacle a multiplicity of pipes $c^3$, $c^3$, extend. These pipes are of such a length that when the receptacle is in position they will open at their lower ends a short distance from the bottom of the main casing. They are supported and braced, relatively, at their lower ends by the spider $c^4$.

The relative sizes of the main casing and the filtering receptacle are such that when they are assembled an annular chamber A' is formed between their walls and the cylindrical chamber or reservoir B' between their bottoms. The first of these chambers, A', serves to store the filtered oil and to form a steam-jacket around the receptacle as will be hereinafter explained, and the second chamber, B', forms a water reservoir in which the oil is washed, in the manner which will also be hereinafter explained. In the upper and lower portions of the receptacle waste or other analogous material is held in two separate bodies between which is interposed a piece of fabric, such as flannel, felt, &c. These bodies of waste and the interposed fabric are, primarily, the filtering agents or mediums.

The filtering receptacle will now be described in detail. In the lower part of the receptacle, a short distance from the bottom of the same, a reticulated partition D is secured. Above this partition a reticulated plate $d$ is removably supported. The space between the partition D and the plate $d$ is filled with waste or other analogous material. The plate $d$ is fixed to the cylindrical band $d'$ which serves to stiffen it and protects it against being accidentally bent on its removal. The cylindrical band rests upon lugs $d^2$, $d^2$, suitably secured to the shell $c$. Above the removable plate $d$ a second plate E is also removably supported. It is constructed similarly to the plate $d$, but is supported in a different manner. In this instance it would not do to use lugs projecting from the shell as they would obstruct the passage of the lower plate. Hangers $e$, $e$, are used. They consist of thin strips of metal attached to the plate at their lower ends in any suitable manner and are bent outwardly at their upper ends so as to engage with the upper edge of the receptacle.

F designates a pan supported within the upper part of the shell $c$. It consists of the shell $f$ having its walls inclined so as to give a proper clearance of the hangers $e$, $e$. The pan has considerable depth and in order to give the necessary space between its bottom and the plate E it will extend a considerable distance above the casing. To support it in its proper position a cylindrical band $f'$ is secured around the upper edge of the shell, which will, when the pan is in position, rest upon the flange $c'$. The bottom of the pan is formed of a reticulated plate $f^2$ and a considerable distance above the same a reticulated plate $f^3$ is removably supported. This latter plate is secured to the cylindrical band $f^4$ and is supported upon the lugs $f^5$, $f^5$. It is to be observed that the plate projects beyond the band so as to cover the space intervening between the straight side of the same and the inclined wall of the pan. The pan is provided with a cover G of any suitable construction.

H designates the feed pipe. It is inclosed in the space formed between the main casing and the filtering receptacle. It extends through the annular flange $c'$ down one side of the filtering receptacle, beneath the latter through the water reservoir between the pipes $c^3$, $c^3$, up the opposite side of the filtering receptacle, through the flange $c'$ and then turned inwardly through the projecting wall of the pan F and opens into the latter. The opposite end of the pipe extends a considerable distance above the pan and has a funnel $h$ secured thereto.

A steam pipe I leading from a suitable generator enters the reservoir a short distance above the bottom of the same. This pipe will also supply water to the reservoir when necessary. An eduction pipe J is connected with the bottom $a'$ at its lowest point. Both of these pipes are provided with the ordinary valves and means for operating the same.

The several movable partitions, $d$, E, and $f^3$, are provided with rings $x$, $x$, to assist in their removal.

The operation of the device is as follows. The reservoir B' having been previously filled with water to a point intermediate of the gage cocks $a^2$, $a^2$, steam is introduced into the machine. In this way the water is heated and the annular chamber A' is filled with steam forming a steam-jacket around the filter, proper. The waste oil is poured into the feed pipe H and passes through the same into the pan F. In its passage through the pipe the oil becomes heated and to a considerable extent is freed of its gummy properties. It is then fed to the filter proper in a condition adapted to a quick passage through the several filtering mediums. After entering the pan F it is strained of its grosser impurities by the reticulated plate $f^3$. It then passes through the filtering medium contained between the reticulates $f^2$ and $f^3$. After leaving the pan the oil passes through a piece of fabric $E^5$, such as flannel, felt, &c., supported by the reticulated plate E which will further relieve it of its impurities. The oil then passes through the filtering medium contained in the lower part of the receptacle and is still further relieved of its impurities and then passes through the pipes $c^3$, $c^3$, to the bottom of the reservoir B' and escapes into the water and by reason of its lighter specific gravity floats to the top, being thoroughly washed in its passage, and collects in the annular chamber A' ready to be drawn off and used.

The filtering medium which I prefer to use in the upper and lower parts of the receptacle is the ordinary cotton waste used in cleaning machinery. In the upper part of the receptacle waste of a coarser fiber may be used than that in the lower, or the waste that has been used in the lower part long enough to become unfit for the final straining can still be further used in the upper part.

By separating the filtering medium into two bodies and interposing between them a fabric filter particular advantages are secured. If the filtering medium should be used in one mass, by uneven packing of the same, the oil might find a channel through the same which it would follow instead of spreading through the entire mass, which in time would become a deleterious feature. This is overcome to a great extent by separating the medium into two bodies and interposing between the same a fabric filter. As the fabric is generally of a uniform texture, the oil on being deposited on the same will be spread over the entire surface and be deposited in consequence over the entire surface of the filtering medium beneath it. The oil being spread over the entire upper surface of the waste will be more apt to permeate through the entire mass.

It is to be observed that in its entire passage through the machine the oil is subjected to heat, the feed pipe being in the annular chamber A' and the filter proper being surrounded by a steam-jacket. This construction particularly adapts the machine to filtering extremely gummy oils. If it is desired a thermometer can be attached so that the temperature can be regulated as desired, but ordinarily this will not be necessary.

In some cases, instead of introducing the oil through the feed pipe to the filter it can be poured directly into the pan F. This will depend, however, on the character of the oil.

It is further to be observed that the oil must pass directly through the filtering receptacle and water reservoir before it can reach the collecting tank. In some machines of this class, the construction is such that the oil can overflow the filtering pans and become mixed with the oil that has been already filtered. In the present instance it is proposed to overcome these objections.

It is obvious that the machine can be easily cleaned by the removal of the pan and reticulated plates, and by introducing steam into the casing by means of the pipe $l$. The pipe J will carry off the waste water. If any sediment should collect in the lower bend of the supply pipe, it can be removed through the openings closed by the plugs $h^9$, $h^9$.

The invention as it has been described and illustrated is the preferred form, but I do not wish to be confined to this specific construction, as it can be departed from to some extent without departing from the spirit of the invention.

Having thus described my invention, what I claim, and desire to secure by Letters Patent, is—

1. In an oil filter, the combination of the filtering receptacle consisting of a single shell, the reticulated plates removably seated in the lower end of the said shell, the pan having a recticulated bottom removably seated in the upper end of the said shell, the said plates and pan being adapted to sustain a filtering medium in separate bodies, the casing surrounding the said receptacle forming with the shell of the same a chamber, the said receptacle connecting at its lower end with the said chamber, and the induction and eduction pipes connected with the chamber, substantially as described.

2. In an oil filter, the combination of the filtering receptacle consisting of a single shell, the reticulated plates removably seated in the lower end of the said shell, the pan having a reticulated bottom removably seated in the upper end of the said shell, the said plates and pan being adapted to sustain a filtering medium in separate bodies, the reticulated plate removably supported between the pan and the first mentioned plates adapted to support a fabric, the casing surrounding the said receptacle forming with the shell of the same a chamber, the said receptacle connecting at its lower end with the said chamber, and the induction and eduction pipes connected with the chamber, substantially as described.

3. In an oil filter, the combination of the casing, the filtering receptacle supported therein, the shells of the casing and receptacle forming an annular chamber surrounding the said receptacle, the steam pipe connected with the said chamber, and the feed pipe inclosed within the said annular chamber leading from the exterior of the casing and emptying into the upper part of the receptacle, substantially as described.

4. In an oil filter, the combination of the casing, the filtering receptacle having an annular flange surrounding its upper end placed within the casing with the said flange resting upon the casing, the shells of the casing and receptacle forming an annular chamber surrounding the latter, the feed pipe leading from the exterior of the casing through the said flange on one side through the annular chamber and upward through the flange on the opposite side and emptying into the filtering receptacle, and the steam pipe entering the said annular chamber, substantially as described.

5. In an oil filter, the combination of the casing, the filtering receptacle supported therein, the shells of the casing and receptacle forming an annular chamber surrounding the said receptacle, the steam pipe connected with the said chamber, the feed pipe inclosed within the said chamber leading from the exterior of the casing and emptying into the upper part of the receptacle and having openings in its lower turn closed by removable covers, substantially as described.

In testimony whereof I affix my signature in presence of two witnesses.

LEWIS H. COLEMAN.

Witnesses:
G. BURROUGHS,
BENJ. T. WELCH, Jr.